United States Patent Office 3,120,429
Patented Feb. 4, 1964

3,120,429
LUBRICATING COMPOSITIONS FOR TWO-CYCLE INTERNAL COMBUSTION ENGINES
Alfred Towle and Alan Stuart Anderson, both of Derby, England, assignors to The Lubrizol Corp., Wickliffe, Ohio, a corporation of Ohio
No Drawing. Filed May 1, 1961, Ser. No. 106,534
7 Claims. (Cl. 44—58)

This invention relates to lubrication of two-cycle (i.e., two-stroke) spark ignition internal combustion engines and in a more particular sense it relates to improved lubricating compositions for use in such engines.

The lubrication of a two-cycle internal combustion engine is provided by an oil-fuel mixture. In this situation the combustion characteristics of the oil are as important as its lubricating characteristics in maintaining proper performance of the engine. While mineral lubricating oils provide a desirable and economical source of the oil for use in such engine, they are unfortunately characterized by a tendency to form harmful products of combustion. Such products eventually agglomerate to form deposits in the engine and are a principal cause not only of excessive engine wear but also of other difficulties such as spark plug fouling, piston ring sticking, formation of combustion chamber deposits, etc. Hence, in recent years, a great deal of effort has been devoted to improvement in the combustion characteristics of lubricating oils for use in two-cycle engines.

Accordingly, it is a principal object of this invention to provide a method for improving lubricating oils for use in two-cycle engines.

It is also an object of this invention to provide an improved lubricating oil adapted especially for use with gasolines to form a fuel mixture for two-cycle engines.

It is also an object of this invention to provide lubricating oil-gasoline mixtures having improved combustion and lubricating characteristics.

These and other objects are attained in accordance with this invention by providing in the operation of two-cycle spark ignition internal combustion engines fueled with a gasoline-lubricating oil mixture, the improvement which comprises the incorporation into said mixture of a small amount, sufficient to inhibit the tendency of said mixture to form combustion deposits, of an additive selected from the class consisting of dehydroabietylamine and the ethylene oxide adducts, acetate, phenolates and sufonates thereof.

Dehydroabietyl amine has the following formula:

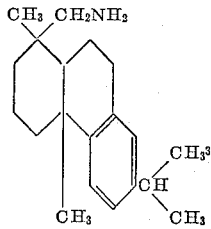

A convenient source material for preparing this amine is rosin derived from e.g., pine trees. The amine can be obtained by treating a rosin acid with ammonia to form an amide, dehydrating the amide to a nitrile and then hydrogenating the nitrile. The product of this process consists essentially of dehydroabietyl amine and also a small amount of nuclear-hydrogenated abietyl amines such as dihydroabietylamine. An especially useful dehydroabietylamine is available commercially under the trade name of "Rosin Amine D" which is a technical grade of the amine containing small amounts of dihydro- and tetra-hydroabietylamines.

Derivatives of dehydroabietylamine are likewise useful as additives for the purpose of this invention. They include principally the ethylene oxide adducts, acetate, phenolates and sulfonates of dehydroabietylamine. These derivatives are obtained as a result of reaction of the amino group of dehydroabietylamine with ethylene oxide, acetic acid, a phenolic compound or a sulfonic acid, respectively. Thus, the ethylene oxide adducts are prepared by treating the amine with ethylene oxide at a temperature usually within the range of about 0° to 300° C. More than one mole of ethylene oxide may be allowed to react with the amine to give a product having a plurality of oxy-ethylene groups. Such reaction usually requires the use of an alkaline catalyst such as sodium hydroxide. The formation of dehydroabietylamine-ethylene oxide adducts may be exemplified by reactions represented as follows:

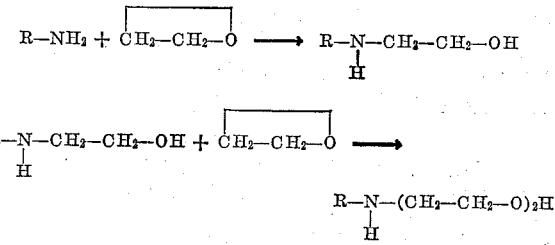

The R radical in these equations represents the dehydroabietyl radical.

The acetate, phenolates, and sulfonates of dehydroabietylamine can be obtained simply by reacting the amine with an appropriate acid, i.e., acetic acid, a phenol or a sulfonic acid, respectively, at a temperature usually within the range of about 0° C. to 300° C. The product comprises essentially the amine salt of the acid used.

The sulfonic acids useful in preparing the salt are oil-soluble sulfonic acids such as petroleum mahogany acid and acids prepared by sufonating an alkylated aromatic compound with oleum, sulfuric acid or chlorosulfonic acid. The alkylated aromatic compound from which the sulfonic acid is derived should contain at least about 12 aliphatic carbon atoms in the alkyl radical in order to impart sufficient oil solubility to the acid. Examples of alkylated aromatic compounds include dodecylbenzene, didodecylbenzene, polyisobutene (molecular weight 350)-substituted naphthalene, etc.

Both phenol and alkylphenols form salts with dehydroabietylamine which are useful for the purpose of this invention. Alkylphenols having from about 4 to about 30 carbon atoms in the alkyl radical are preferred. Examples of the phenols useful herein include phenol, p-butylphenol, iso-octylphenol, polyisobutene (molecular weight of 750)-substituted phenol, di-pentylphenol, bis-(hydroxyl phenyl)-methane, etc. The salts are obtainable by heating a mixture of a phenol and dehydroabietylamine to a temperature above about 150° C. but below about 350° C. Their formation is facilitated in most instances by heating the reactants under superatmospheric pressures.

The present invention contemplates also the presence of a metal-containing detergent in the lubricating oil containing the dehydroabietylamine additive. A particularly useful detergent is an oil-soluble alkaline earth metal salt of either petroleum mahogany acid or a sulfonic acid obtained by sulfonation of an alkylated aromatic compound such as described hereinbefore. The alkaline earth metal salt may be either a neutral salt or a basic salt. The barium and calcium salts are preferred for use in this invention.

The term "basic salt" designates the metal salt in which the metal is present in stoichiometrically larger amounts than the organic sulfonate radical. A commonly used method for preparing the basic metal salt involves heating an oil-soluble sulfonic acid in the diluent such as mineral oil with a stoichiometric excess of an alkaline earth metal neutralizing agent such as the metal oxide, metal hydroxide, metal carbonate, metal sulfide, or the like and filtering the resulting mixture. The use of a promoter compound in the neutralization step is likewise well-known in the art. The compounds useful as the promoter include phenolic compounds such as phenol, naphthol, butylphenol, octylnaphthol; and polyisobutene (molecular weight of 500)-substituted phenol; alcohols such as methyl alcohol, butyl alcohol, ethylene glycol, cellosolve, carbitol, decyl alcohol, and oleyl alcohol; amines such as aniline, phenyl beta-naphthylamine, phenothiazine, and phenylenediamine. A particularly effective method for preparing the basic salt comprises carbonating a mixture of an oil-soluble acid, e.g., mahogany acid, with a stoichiometric excess of an alkaline earth metal neutralizing agent in the present of a phenolic promoter or an alcohol promoter at a temperature above about 50° C., preferably between 80° C. and 200° C.

The following examples illustrate the processes useful for preparing the metal detergents:

EXAMPLE A.—NEUTRAL CALCIUM DETERGENT ADDITIVE

A mineral oil solution containing 50% by weight of a sodium petroleum sulfonate (molecular weight of 500) is heated at 90° C. for 2 hours with a 20% stoichiometric excess of calcium chloride and 10% by weight of water. The mixture is then dehydrated by heating to 150° C. and the inorganic chlorides removed by filtration. The filtrate is an oil solution of a neutral calcium petroleum sulfonate.

EXAMPLE B.—BASIC CALCIUM DETERGENT ADDITIVE

A mixture of 520 parts of a mineral oil, 480 parts of a sodium petroleum sulfonate (molecular weight of 480) and 84 parts of water is heated at 100° C. for 4 hours. The mixture is then heated with 88 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol and blown with carbon dioxide at 50° C. until substantially neutral. The mixture is then heated to 150° C. to distill off methyl alcohol and water and the resulting oil solution of the basic calcium sulfonate filtered. The filtrate is found to have a sulfate ash of 16%.

EXAMPLE C.—BASIC CALCIUM DETERGENT ADDITIVE

A mixture of 300 grams of mineral oil, 690 grams (0.5 mole) of neutral calcium mahogany sulfonate, 75 grams of water and 29 grams of lime (90% purity) is heated at 100° C. for 2 hours and then to 150° C. during a period of 7 hours. The mixture is blown with carbon dioxide at 150° C. until substantially neutral and filtered. The filtrate is found to have a sulfate ash content of 8.2%.

EXAMPLE D.—BASIC BARIUM DETERGENT ADDITIVE

A mixture of 490 parts of a mineral oil, 110 parts of water, 61 parts of heptylphenol, 340 parts of neutral barium mahogany sulfonate and 227 parts of barium oxide is heated at 100° C. for 0.5 hour and then to 150° C. Carbon dioxide is then bubbled into the mixture until the mixture is substantially neutral. The mixture is filtered and the filtrate found to have a sulfate ash content of 25%.

EXAMPLE E.—BASIC MAGNESIUM DETERGENT ADDITIVE

A methyl alcohol suspension containing 14% by weight of magnesum methoxide is blown with carbon dioxide at 40° C. until it is acidic to alpha-naphtholbenzein indicator, whereupon a homogeneous solution is obtained. The solution (200 parts by weight) is added dropwise to 27 parts of an alkylated benzene-sulfonic acid having a molecular weight of 450, 123 parts of a mineral oil and 75 parts of water, and the resulting mixture is heated to 150° C. The residue is filtered and the filtrate contains 40% by weight of sulfate ash.

EXAMPLE F.—NEUTRAL BARIUM DETERGENT ADDITIVE

To 4400 grams of a mineral oil solution containing 4.25 moles of sodium mahogany sulfonate there is added 680 grams of barium chloride dihydrate in 1500 ml. of water at 95° C. The mixture is heated at 80°–90° C. for 1.5 hours, and the aqueous layer removed. The oil layer is washed with water-isopropanol-phosphoric acid mixture (weight ratio of 1700:100:20, respectively), then dried at 160° C./30 mm. and filtered. The filtrate has a sulfate ash content of 10.7%.

The relative proportions of the gasoline to the lubricating oil used in the oil-fuel mixture for two-cycle spark ignition engines may vary within wide ranges such as from a ratio of about 90:1 to a ratio of about 5:1 by volume. The preferred ratio is in the neighborhood of about 20:1 to about 50:1, respectively, of the gasoline to the lubricating oil.

Lubricating base oils useful in two-cycle engines are usually characterized by viscosity values from about 30 to about 200 SUS (Saybolt Universal seconds) at 210° F. The most commonly used oils are mineral lubricating oils having viscosity values from about 40 to about 120 SUS at 210° F. and may be exemplified by mineral lubricating oils of SAE 20 to SAE 50 grades.

As indicated previously, the additives of this invention are effective in improving the combustion and lubricating characteristics of the gasoline-lubricating oil mixtures for use in two-cycle spark ignition engines. More specifically, they are capable of inhibiting the tendency of such mixtures to form harmful deposits of combustion, and thus reducing the occurrence of spark plug fouling, piston ring sticking, exhaust port clogging and other such difficulties as are commonly encountered in the operation of the engine. A small amount, as little as 0.05% by weight, of an additive of this invention in the lubricating oil is often sufficient to accomplish the desired improvement of the gasoline-lubricating oil mixtures. In most applications, the lubricating oil contains from about 0.1% to about 5%, preferably from about 0.5% to about 2%, by weight of the dehydroabietylamine additive. It may also contain from about 0.1% to about 10%, usually from about 0.5% to about 5%, by weight of a metal-containing detergent additive. A particularly preferred lubricant for use in two-cycle engines comprises a SAE 30 mineral lubricating oil containing about 0.25%–1% by weight of dehydroabietylamine and about 1%–5% by weight of a basic barium or calcium sulfonate such as prepared by the process illustrated hereinabove. The additives may be incorporated into the lubricating oil simply by mixing with the oil at ordinary or elevated temperatures such as from about room temperature to about 150° C.

The following examples illustrate further the gasoline-lubricating oil mixtures of this invention (the relative proportions of the components in such mixtures are expressed in parts by volume):

*Example 1*

|   | Parts |
|---|---|
| SAE 20 mineral lubricating oil to which there has been added 2% by weight of dehydroabietylamine | 1 |
| Gasoline having an octane number of 98 | 20 |

*Example 2*

|   | Parts |
|---|---|
| SAE 30 mineral lubricating oil containing 0.5% by weight of dehydroabietylamine and 3% by weight of the neutral calcium petroleum mahogany sulfonate of Example A | 1 |
| Gasoline having an octane number of 102 | 16 |

*Example 3*

|   | Parts |
|---|---|
| SAE 50 mineral lubricating oil containing 1% by weight of the adduct of dehydroabietylamine with a molar equivalent amount of ethylene oxide | 1 |
| Gasoline having an octane number of 85 | 30 |

*Example 4*

|   | Parts |
|---|---|
| SAE 40 mineral lubricating oil containing 1.5% by weight of dehydroabietylamine acetate and 2% by weight of a neutral barium salt of didodecyl benzene sulfonic acid | 1 |
| Gasoline having an octane number of 95 | 50 |

*Example 5*

|   | Parts |
|---|---|
| SAE 60 mineral lubricating oil containing 2% by weight of dehydroabietylamine-p-butyl-phenolate and 1.5% by weight of the basic barium mahogany sulfonate of Example D | 1 |
| Gasoline having an octane number of 99 | 20 |

*Example 6*

|   | Parts |
|---|---|
| SAE 30 mineral lubricating oil containing 2% by weight of dehydroabietylamine mahogany sulfonate | 1 |
| Gasoline having an octane number of 85 | 25 |

*Example 7*

|   | Parts |
|---|---|
| SAE 50 mineral lubricating oil containing 0.5% by weight of dehydroabietylamine and 3% by weight of the basic calcium sulfonate of Example B | 1 |
| Gasoline having an octane number of 90 | 30 |

The following examples illustrate the effectiveness of the additives of this invention in improving the lubricating and combustion characteristics of the oil-fuel mixture useful in two-cycle engines:

*Example 8*

A 49 cc. two-stroke engine was run at full speed at the full load output using an SAE 30 lubricating oil in proportion of 1:16 by volume (as recommended by the engine manufacturer) in the gasoline, which was representative of present day premium petrol fuels as sold in Great Britain.

After 20 hours running the piston rings were stuck and the exhaust ports were substantially completely blocked.

The experiment was repeated using an SAE 30 oil with 3.5% by weight of a detergent of the barium sulphonate of Example D type, and 2% by weight of the commercial rosin amine "D." After 100 hours running the engine was stopped and showed no trace of ring sticking, only a small exhaust port deposit and no plug bridging.

*Example 9*

Further bench comparative tests carried out on 49 cc. Minimotor motor-assisted cycle units gave the following results on the SAE 30 oil.

| Number of Tests | Treatment of Mineral Oil | Average hrs. before full throttle power falls by ⅓ | Port Clogging Area, Percent | Ring Sticking | Piston Deposits | Average hrs. run per spark plug |
|---|---|---|---|---|---|---|
| 3 | Nil | 40 | 40 | 2 stuck | Heavy | 20 |
| 6 | 7% of two-stroke concentrate (as used in Example 8). | 100 | 50 | 2 sluggish | Moderate | 60 |

*Example 10*

Two Vespa Motor scooters were run on oil treated with 7% of the concentrate as used in Example 8 and two on the same oil untreated for 5000 miles flat out on the MIRA Proving Ground.

The two scooters run on straight oil both seized due to excessive piston deposits shortly before the completion of the test, while the two on treated oil showed no sign of trouble.

A total of 30 sparking plug changes due to whiskering (bridging of the spark gap by fine conducting particles) were required on the two machines operating on straight oil: none were changed due to this cause on the other two machines.

Internal engine cleanliness throughout the two machines operating on treated oil was considerably better than on straight oil.

*Example 11*

One hundred hour overload tests at full throttle on water-cooled Seagull outward motor-boat engines showed a progressive increase in piston cleanliness and in freedom from ring sticking as the concentration of the concentrate as used in Example 10 in an SAE 30 mineral oil was increased from zero to 1%, etc. up to 7%.

*Example 12*

Tests of over 5000 miles duration on Vespa Motor Scooters and Royal Enfield motorcycles confirmed the beneficial influence of the concentrate as used in Example 8, on spark plug life and elimination of the whiskering, ring sticking and port and piston deposits under stop and start conditions as well as full throttle. Road tests of over 1000 miles duration on Minimotor or Cyclomate machines, also confirmed these conclusions under stop and start conditions.

This application is a continuation-in-part of application Ser. No. 532,795, filed September 6, 1955, and now abandoned.

What is claimed is:

1. In the operation of two-cycle spark ignition internal combustion engines fueled with a gasoline-lubricating oil mixture, the improvement which comprises the incorporation into said mixture of a small amount, sufficient to inhibit the tendency of said mixture to form combustion deposits, of an additive selected from the class consisting of dehydroabietyl amine and the ethylene oxide adducts, acetate, phenolates and sulfonates thereof.

2. The improvement of claim 1 characterized further in that the lubricating oil contains an alkaline earth metal sulfonate.

3. The improvement of claim 1 characterized further in that the additive is dehydroabietyl amine.

4. The improvement of claim 2 characterized further in that the alkaline earth metal sulfonate is a basic sulfonate.

5. The improvement of claim 1 characterized further in that the additive is dehydroabietyl amine and the lubricating oil contains a detergent selected from the group consisting of basic calcium and barium mahogany sulfonates.

6. The improvement of claim 5 characterized further in that the detergent is a basic barium mahogany sulfonate.

7. The improvement of claim 1 characterized further in that the additive is a dehydroabietyl amine composition derived from rosin.

References Cited in the file of this patent

UNITED STATES PATENTS

| | | |
|---|---|---|
| 2,296,069 | Talbert et al. | Sept. 15, 1942 |
| 2,527,987 | Caron et al. | Oct. 31, 1950 |
| 2,684,292 | Caron et al. | July 20, 1954 |
| 2,839,469 | Pfeifer et al. | June 17, 1958 |
| 2,857,253 | Hinkamp et al. | Oct. 21, 1958 |
| 2,866,694 | Glendenning et al. | Dec. 30, 1958 |
| 2,896,593 | Rimenschneider | July 28, 1959 |

FOREIGN PATENTS

| | | |
|---|---|---|
| 502,437 | Belgium | July 18, 1952 |